United States Patent
Bae et al.

(10) Patent No.: US 9,148,070 B2
(45) Date of Patent: Sep. 29, 2015

(54) HIGH POWER CONTROL SYSTEM AND CONTROL METHOD THEREOF

(71) Applicant: Destin Power Inc., Gyeonggi-do (KR)

(72) Inventors: Young Sang Bae, Seoul (KR); Seong Jin Oh, Seoul (KR)

(73) Assignee: DESTIN POWER INC., Gyeonggi-do (KR)

( * ) Notice: Subject to any disclaimer, the term of this patent is extended or adjusted under 35 U.S.C. 154(b) by 202 days.

(21) Appl. No.: 13/907,107

(22) Filed: May 31, 2013

(65) Prior Publication Data

US 2014/0119069 A1 May 1, 2014

(30) Foreign Application Priority Data

Oct. 30, 2012 (KR) .......................... 10-2012-0120986

(51) Int. Cl.
*H02M 7/44* (2006.01)
*H02M 7/493* (2007.01)
*H02M 1/12* (2006.01)
*H02J 3/32* (2006.01)

(52) U.S. Cl.
CPC *H02M 7/493* (2013.01); *H02J 3/32* (2013.01); *H02M 1/126* (2013.01)

(58) Field of Classification Search
CPC . G06F 1/0342; H02M 7/493; H02M 7/53875; H02J 3/46
USPC .......... 323/264–267, 271–274, 282–288, 290, 323/299; 363/15–17, 37, 41, 65, 71, 95, 97, 363/98
See application file for complete search history.

(56) References Cited

U.S. PATENT DOCUMENTS

| | | | |
|---|---|---|---|
| 6,177,739 B1 * | 1/2001 | Matsudaira et al. | 307/125 |
| 6,239,997 B1 * | 5/2001 | Deng | 363/95 |
| 6,285,572 B1 | 9/2001 | Onizuka et al. | |
| 7,212,419 B2 * | 5/2007 | Vinciarelli | 363/65 |
| 7,301,313 B1 * | 11/2007 | Hart et al. | 323/269 |
| 7,602,627 B2 * | 10/2009 | Ohshima et al. | 363/97 |
| 7,692,910 B2 * | 4/2010 | Lavier et al. | 361/93.1 |
| 8,878,501 B2 * | 11/2014 | Kalje et al. | 323/272 |
| 2010/0020576 A1 | 1/2010 | Falk | |

* cited by examiner

*Primary Examiner* — Rajnikant Patel
(74) *Attorney, Agent, or Firm* — Rabin & Berdo P.C.

(57) ABSTRACT

A high power control system includes: a single energy source; an energy source management unit configured to manage the energy source; a controller configured to output a PWM control signal under control of the energy source management unit; a plurality of inverters configured to convert a direct current into an alternating current under control of the PWM control signal of the controller; a plurality of filters coupled to output terminals of the inverters; and a plurality of switches configured to regulate connections between the filters and a load under control of a regulation control signal of the controller.

5 Claims, 4 Drawing Sheets

HIGH POWER CONTROL SYSTEM AND CONTROL METHOD THEREOF

BACKGROUND OF THE INVENTION

The present invention relates to a high power control system and a control method thereof, and more particularly, to a high power control system for converting a DC output of a high power battery into an AC output and a control method thereof.

Due to exhaustion of fossil fuel, attempts to use new regeneration energy such as sunlight and wind have been gradually increased. Furthermore, in order to efficiently use generation facilities, generated energy may not be directly used, but stored in a battery so as to be utilized during a peak load.

As the power of new regeneration energy or energy stored in a battery is increased to high power, for example, 500 kW or 1 MW, the capacity of an inverter to convert the energy has been also increased. In order to drive a high power inverter, a lot of elements must be considered.

FIG. 1 is a block configuration diagram of a conventional energy storage device including one inverter. In the energy storage device, one controller controls one inverter. Such a structure has high total harmonic distortion (THD) and high input current ripple. Furthermore, when the inverter is broken down, power supply may be stopped, and a low mean time between failure (MTBF) may degrade the reliability of the system may be degraded, and increase the maintenance cost.

In order to solve such problems, a method of controlling a plurality of inverters in parallel has been proposed.

FIG. 2 is a block configuration diagram of a conventional energy storage device including a plurality of parallel inverters. In the energy storage device, one controller controls a plurality of parallel inverters. In such a structure, when one inverter is broken down, a spare inverter may be used to drive the energy storage device. Thus, power supply may not be stopped, but the broken inverter may be easily replaced to thereby make it easier to maintain the system. In this case, however, since a circulating current flows among inverters, the inverters cannot be operated in a state where a load is assigned to the inverters. Furthermore, since the inverters cannot be independently controlled, the inverters cannot be circularly activated. Thus, since it is difficult to expect high MTBF, the reliability of the system may be degraded. Furthermore, since the parallel inverters are operated at the same time, the energy storage device cannot satisfy THD required by a battery during a low-load condition, and cannot secure low input current ripple.

SUMMARY OF THE INVENTION

An embodiment of the present invention is directed to a high power control system capable of removing a circulating current without using a transformer between a system and the high power control system, and a control method thereof.

Another embodiment of the present invention is directed to a high power control system having low THD under a low load condition and a control method thereof.

Another embodiment of the present invention is directed to a high power control system capable of reducing a ripple current of a battery serving as an energy source, and a control method thereof.

In accordance with an embodiment of the present invention, a high power control system includes: a single energy source; an energy source management unit configured to manage the energy source; a controller configured to output a PWM control signal under control of the energy source management unit; a plurality of inverters configured to convert a direct current into an alternating current under control of the PWM control signal of the controller; a plurality of filters coupled to output terminals of the inverters; and a plurality of switches configured to regulate connections between the filters and a load under control of a regulation control signal of the controller.

When a second inverter is to be additionally operated in a state where a first inverter of the plurality of inverters is operated, the controller may first apply the PWM control signal to the second inverter, and then apply a regulation control signal for operation to a second switch connected to the output terminal of the second inverter.

When a second inverter is to be stopped in a state where a first inverter and the second inverter among the plurality of inverters are operated, the controller may first apply a regulation control signal for release to turn off a second switch connected to an output terminal of the second inverter, and then control the PWM control signal to not be applied to the second inverter.

In accordance with another embodiment of the present invention, there is provided a control method of a high power control system in which two or more inverters are connected in parallel to a single energy source, the two or more inverters are coupled one-to-one to two or more switches, and the two or more switches and a load meet at one node. The control method includes: a first step of applying a PWM control signal to a second inverter, when the second inverter is to be additionally operated in a state where a first inverter of the two or more inverters is operated; and a second step of applying a regulation control signal for operation to a second switch connected to an output terminal of the second inverter.

The control method may further include: a third step of applying a regulation control signal for releasing the second switch connected to the output terminal of the second inverter when the second inverter is to be stopped in a state where the first and second inverters are operated; and a fourth step of controlling the PWM control signal to not be applied to the second inverter.

DESCRIPTION OF SPECIFIC EMBODIMENTS

Figure 1:
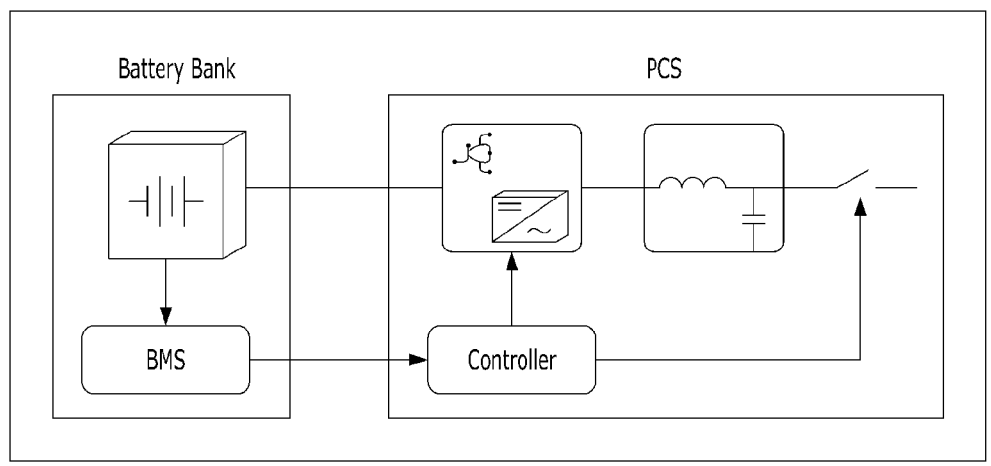
FIG. 1 is a block configuration diagram of a conventional energy storage device including one inverter.
Figure 2:
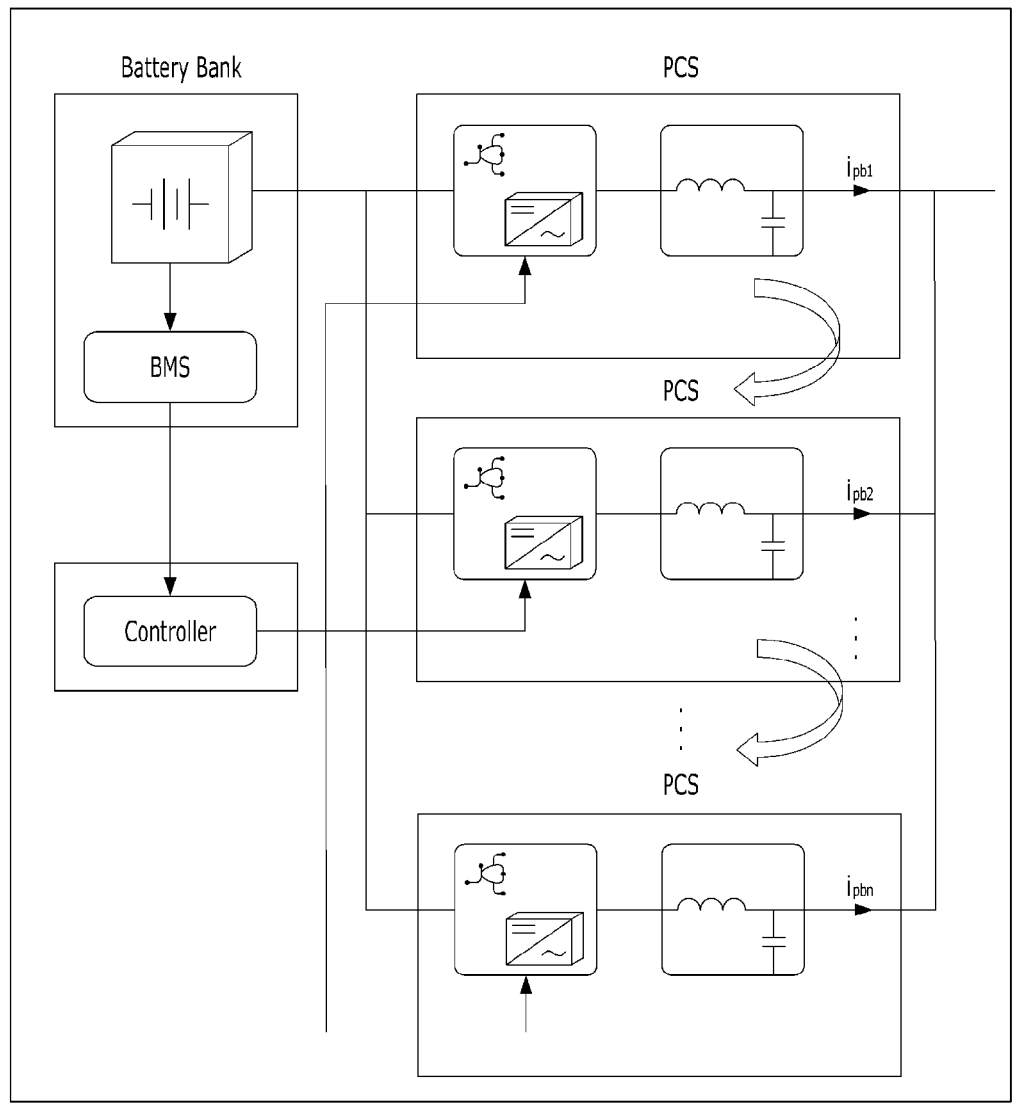
FIG. 2 is a block configuration diagram of a conventional energy storage device including a plurality of parallel inverters.

Before exemplary embodiments of the present invention are described, it should be understood that the applications of the exemplary embodiments are not limited to the details of configurations and arrangements of components described in the following descriptions and illustrated in the drawings.

Hereafter, the exemplary embodiments of the present invention will be described below in more detail with reference to the accompanying drawings. Terms used in this specification and claims must be limited to typical or lexical meanings, and analyzed into meanings which coincide with the technical idea of the present invention based on the principle that the present inventor may properly define the concepts of the terms so as to describe the invention in the best way.

Therefore, it is obvious to those skilled in the art that the embodiments of the present specification and the configurations illustrated in the drawings are only examples and various equivalents and modifications may be made at the time at when the present specification is applied for.

Figure 3:
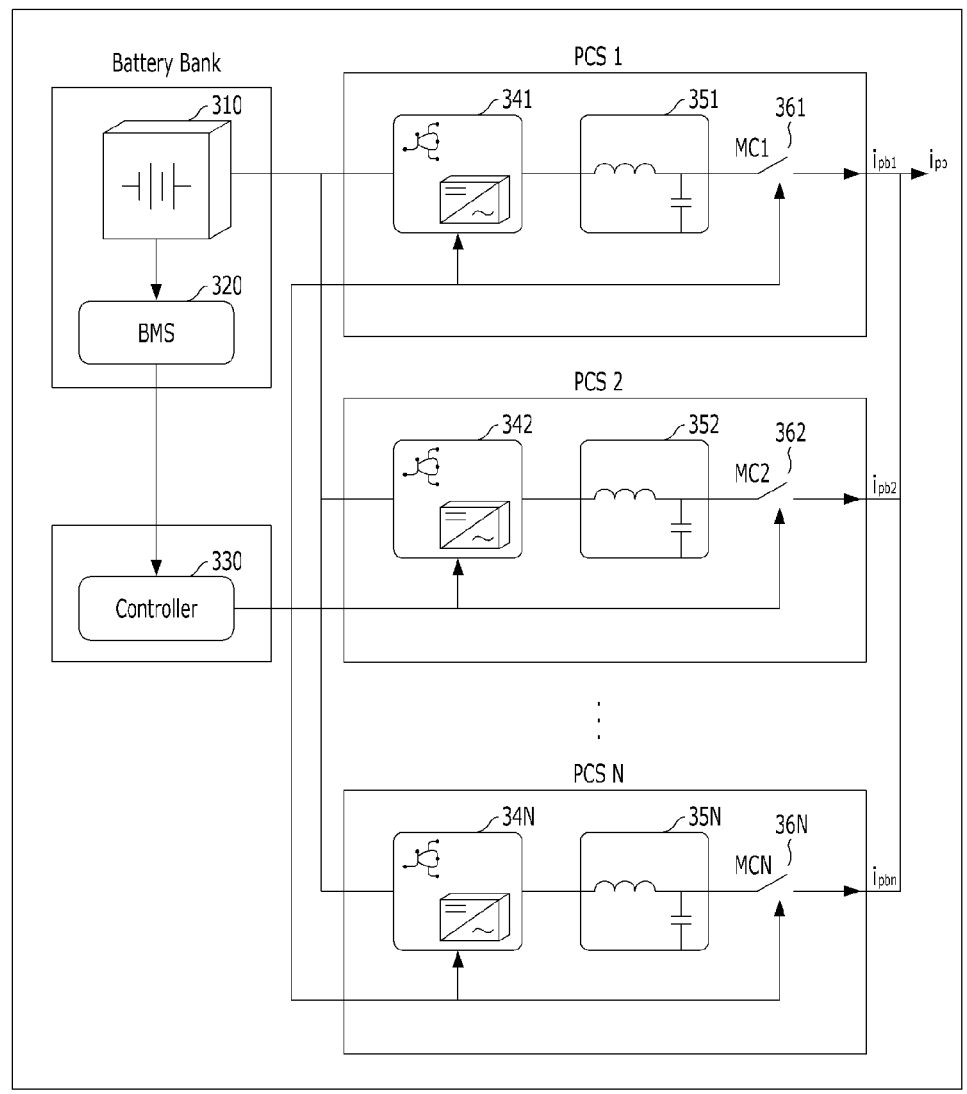
FIG. 3 is a block diagram of a high power control system according to an embodiment of the present invention.
Figure 4:
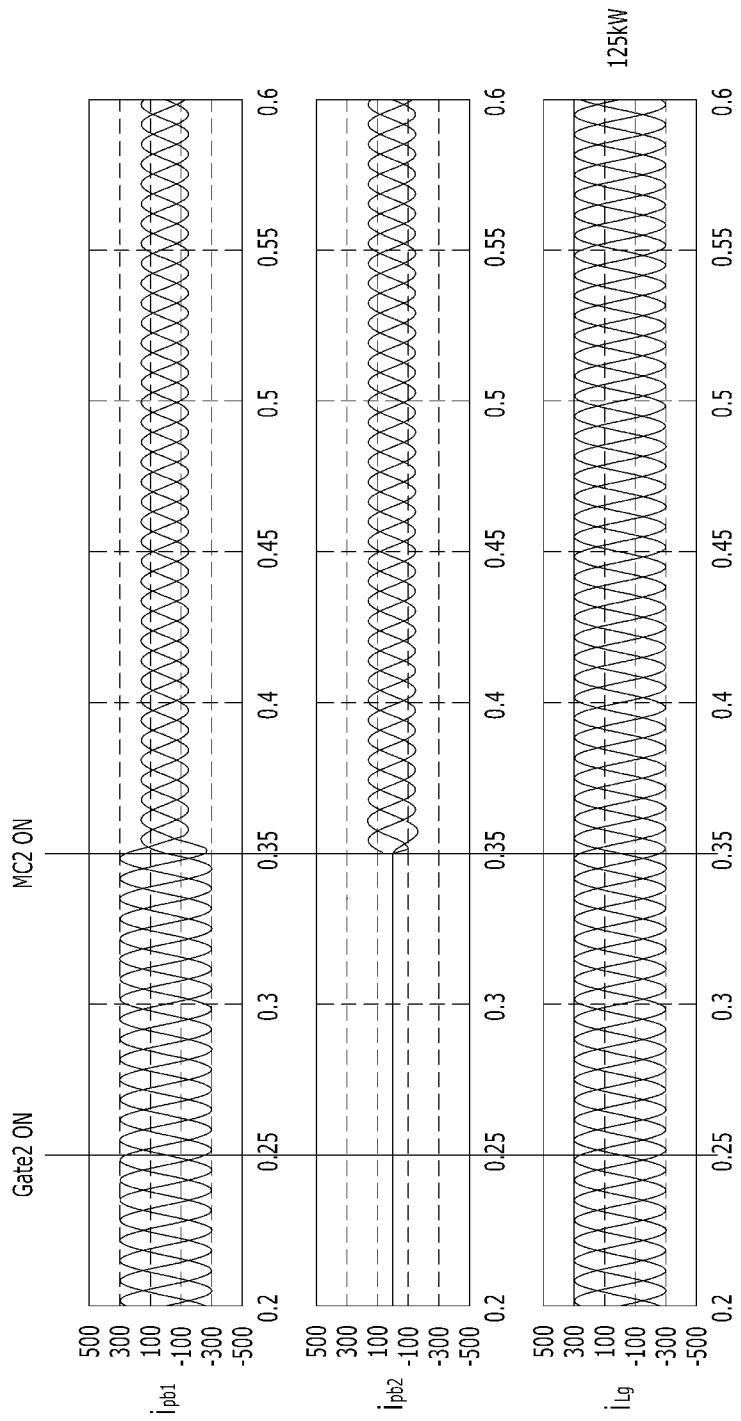
FIG. 4 is a simulation waveform diagram of the high power control system according to the embodiment of the present invention.

FIG. 3 is a block diagram of a high power control system according to an embodiment of the present invention. FIG. 4 is a simulation waveform diagram of the high power control system according to the embodiment of the present invention.

The high power control system according to the embodiment of the present invention includes a single energy source 310, an energy source management system 320, a controller 330, a plurality of inverters 341, 342, . . . , 34N, a plurality of LC filters 351, 352, . . . , 35N, and a plurality of magnet contactors 361, 362, . . . , 36N. The energy source management system 320 is configured to manage the energy source. The controller 330 is configured to output a PWM control signal under control of the energy source management system. The plurality of inverters 341, 342, . . . , 34N are configured to convert a direct current into an alternating current under control of the PWM control signal of the controller 330. The LC filters 351, 352, . . . , 35N are coupled to output terminals of the inverters 341, 342, . . . , 34N. The plurality of magnet contactors 361, 362, . . . , 36N are configured to control connections between the LC filters 351, 352, . . . , 35N and a load (not illustrated) under a regulation control signal of the controller 330.

The single energy source 310 may include any energy sources as long as they are considered as one energy source when seen from the inverters connected in parallel, and does not mean that the energy source is only one. For example, when the energy source is a battery, the energy source may include a plurality of battery banks coupled in series or parallel.

According to the embodiments of the present invention, the energy source 310 may include battery banks, solar modules, wind generators and the like.

The plurality of inverters 341, 342, . . . , 34N are connected to one side of one battery bank 310, and the other ends of the plurality of magnet contactors 361, 362, . . . , 36N are bound to one node so as to be connected to a load. The load may be connected to a commercial power source. According to another embodiment of the present invention, insulated gate bipolar transistors (IGBT) may be used instead of the magnet contactors.

According to the embodiment of the present invention, when the plurality of inverters are operated, the number of operated inverters may be gradually increased according to the size of the load.

For example, when four inverters are provided, the operating number of inverters may have set according to the following table. That is, only one inverter is operated until the load approaches 25% of the rating, and two inverters are operated until the load exceeds 25% and approaches 50%. Thus, when the load is small, THD may be reduced, and when the energy source is a battery, a ripple current may be reduced. When a plurality of inverters are not operated in parallel but one large-capacity inverter is operated, the THD may be excessively increased so that the output of the inverter may be degraded so as not to be connected to the system.

| Load | Power (kW) | Number of operated inverters | THD (%) |
|---|---|---|---|
| 5% | 25 | 1 | 6.94 |
| 10% | 50 | 1 | 3.93 |
| 25% | 125 | 1 | 1.83 |
| 50% | 250 | 2 | 1.07 |
| 75% | 375 | 3 | 0.94 |
| 100% | 500 | 4 | 0.74 |

According to another embodiment of the present invention, only when an inverter is operated, a magnet contactor may be operated. Thus, when an inverter is not operated, a magnet contactor is released, which makes it possible to prevent a circulating current flow.

Furthermore, according to another embodiment of the present invention, the controller applies a PWM control signal to an inverter to be operated, before a regulation control signal is applied to a magnet contactor. Thus, the inverter and the battery bank may be operated as one energy source, thereby preventing a circulating current flow.

Referring to FIG. 4, when the second inverter 342 is to be additionally operated in a state where the first inverter 341 is operated, the controller first applies the PWM control signal to the second inverter 342, and then applies a regulation control signal for operation to turn on the second magnet contactor 362.

According to another embodiment of the present invention, when an operated inverter is to be stopped, the controller applies a regulation control signal for release to turn off a magnet contactor connected to an output terminal of the operated inverter, and then does not apply a PWM control signal to a corresponding inverter.

Furthermore, according to another embodiment of the present invention, a plurality of inverters may be circularly activated to expand the lifetime of the inverters. For example, when a first inverter is activated today, a second inverter may be activated tomorrow, and a third inverter may be activated the day after tomorrow.

According to the embodiments of the present invention, the high power control system may remove a circulating current without using a transformer between a system and the high power control system, may have low THD under a low load condition, and may reduce a ripple current of a battery when the energy source is a battery.

While the present invention has been described with respect to the specific embodiments, it will be apparent to those skilled in the art that various changes and modifications may be made without departing from the spirit and scope of the invention as defined in the following claims.

What is claimed is:

1. A high power control system comprising:
a single energy source;
an energy source management unit configured to manage the single energy source;
a plurality of inverters configured to convert a direct current into an alternating current and including
a first inverter connected to the single energy source, and
a second inverter connected to the single energy source in parallel with the first inverter;
a plurality of filters including
a first filter coupled to an output terminal of the first inverter, and
a second filter coupled to an output terminal of the second inverter;
a plurality of switches configured to regulate connections between the filters and a load and including a first switch disposed between the first filter and the load to connect the first inverter to the load and to disconnect the first inverter from the load, and a second switch disposed between the second filter and the load to connect the second inverter to the load and to disconnect the second inverter from the load;

a single controller configured to output a PWM control signal to the first and second inverters and a regulation control signal to the first and second switches, under a control of the energy source management unit, wherein all of the plurality of inverters and switches are controlled by the single controller, wherein when the second inverter is to be operated in a state where the first inverter is being operated, the single controller first applies the PWM control signal to the second inverter and then applies the regulation control signal to the second switch to connect the second inverter to the load, wherein applying the PWM control signal to the second inverter and applying the regulation control signal to the second switch are performed in this order to prevent a circulating current from flowing among the inverters, and wherein a number of inverters to be operated increases gradually as a size of the load increases in order to reduce a total harmonic distortion (THD).

2. The high power control system of claim 1, wherein the load is connected to a system.

3. The high power control system of claim 1, wherein when the second inverter is to be stopped in a state where the first inverter and the second inverter are being operated simultaneously, the controller first applies the regulation control signal to the second switch to disconnect the second inverter from the load and then stops applying the PWM control signal to the second inverter.

4. A control method of a high power control system which includes a single energy source, an energy source management unit configured to manage the single energy source, two or more inverters configured to convert a direct current into an alternating current and including a first inverter connected to the single energy source, and a second inverter connected in parallel to the single energy source, two or more filters including a first filter coupled to an output terminal of the first inverter, and a second filter coupled to an output terminal of the second inverter, two or more switches including a first switch disposed between the first filter and a load to connect the first inverter to the load and to disconnect the first inverter from the load, and a second switch disposed between the second filter and the load to connect the second inverter to the load and to disconnect the second inverter from the load, a single controller configured to output a PWM control signal to the first and second inverters and a regulation control signal to the first and second switches, under a control of the energy source management unit, wherein all of the inverters and switches are controlled by the single controller, the control method comprising:

a first step of applying, by the single controller, the PWM control signal to the second inverter, when the second inverter is to be additionally operated in a state where the first inverter is being operated; and a second step of applying, by the single controller, the regulation control signal to the second switch to connect the second inverter to the load, wherein the first step and the second step are performed in this order to prevent a circulating current from flowing among the inverters, and wherein a number of inverters to be operated increases gradually as a size of the load increases in order to reduce a total harmonic distortion (THD).

5. The control method of claim 4, further comprising:

a third step of applying the regulation control signal to the second switch to disconnect the second inverter from the load when the second inverter is to be stopped in a state where the first and second inverters are being operated simultaneously; and a fourth step of stopping supplying the PWM control signal to the second inverter.

* * * * *